(12) United States Patent
Smart et al.

(10) Patent No.: US 7,520,337 B2
(45) Date of Patent: Apr. 21, 2009

(54) METHOD AND SYSTEM FOR SHAPING FURROWS IN SOIL

(75) Inventors: Andrew Smart, Narrabri (AU); Frederick William Nelson, Waukee, IA (US)

(73) Assignee: Deere & Company, Moline, IL (US)

( * ) Notice: Subject to any disclaimer, the term of this patent is extended or adjusted under 35 U.S.C. 154(b) by 29 days.

(21) Appl. No.: 11/652,270

(22) Filed: Jan. 11, 2007

(65) Prior Publication Data
US 2008/0172159 A1    Jul. 17, 2008

(51) Int. Cl.
*A01B 79/00* (2006.01)
*G06F 7/70* (2006.01)
*G06F 19/00* (2006.01)
*G06G 7/00* (2006.01)
*G06G 7/76* (2006.01)

(52) U.S. Cl. ............................. 172/1; 701/50
(58) Field of Classification Search ............... 172/1–12, 172/810, 811; 701/50
See application file for complete search history.

(56) References Cited

U.S. PATENT DOCUMENTS

2006/0272562 A1* 12/2006 Eastin et al. ................ 111/200

OTHER PUBLICATIONS

Adem, HH and Tisdall, JM. Automatic Laser-Levelling and Tractor Guidance for the Tatura Permanent Bed System of Cropping [online]. In: Conference on Agricultural Engineering 1986: Preprints of Papers; pp. 1-7. Barton, ACT: Institution of Engineers, Australia, 1986. National conference publication (Institution of Engineers, Australia); No. 86/9. Availability: <http://search.informit.com.au/documentSummary;dn=654389357801149;res=IELENG> ISBN:2858253100. [cited Jun. 14, 2008].

* cited by examiner

*Primary Examiner*—Christopher J. Novosad

(57) ABSTRACT

A method of shaping furrows in soil includes the steps of: determining existing elevation profiles for a plurality of existing furrows in a geographic unit; establishing a target elevation profile for each of the existing furrows; and moving soil laterally either toward or away from one or both side walls along a length of each furrow to achieve the target elevation profiles within the geographic unit.

27 Claims, 4 Drawing Sheets

METHOD AND SYSTEM FOR SHAPING FURROWS IN SOIL

FIELD OF THE INVENTION

The present invention relates to agricultural tillage equipment, and, more particularly, to a method and system for shaping ridges in soil for use with ridge planted crops.

BACKGROUND OF THE INVENTION

Agricultural fields may be irrigated for selective application of water and chemicals, such as liquid fertilizer and insecticides. Irrigation systems may include center pivots, travelers, and surface irrigation. Center pivots and travelers typically use a well and pump arrangement, and apply between 800-1500 gallons per minute of water and entrained chemicals. Surface irrigation typically uses a gated flooding arrangement with a water supply ditch at the high end of the field. In a field that uses surface irrigation, it is a common practice to also use ridge planting techniques. Plants are grown on ridges with furrows between the ridges. The movement of the water is controlled by the slope of the bottom of the furrows. Water moves from one end of the field to the other via the furrows. As water moves through the field, some of the soil is also moved, so the slope changes over time, and as this happens, the effectiveness of the irrigation system decreases over time. Every few years, when the effectiveness of the irrigation system is reduced to the point that crop yields are affected, the field can be completely leveled using a laser plane and earth moving equipment. The ridges are then put back up again using a special ridge forming tool. The costs to completely level, regrade and reestablish the ridges in the field are substantial.

What is needed in the art is a method and system for maintaining the correct slope in the bottom of the furrows for proper irrigation, and lengthening the duration until new ridges must be rebuilt in the field.

SUMMARY OF THE INVENTION

The invention comprises, in one form thereof, a method of shaping furrows in soil, including the steps of: determining existing elevation profiles for a plurality of existing furrows in a geographic unit; establishing a target elevation profile for each of the existing furrows; and moving soil laterally either toward or away from one or both side walls along a length of each furrow to achieve the target elevation profiles within the geographic unit.

The invention comprises, in another form thereof, a system for shaping a furrow in soil, including a positioning system movable across an existing furrow for determining an existing elevation profile along a length of the existing furrow. An implement includes an adjustable ridge forming tool for moving soil laterally either toward or away from at least one side wall of the furrow. A work vehicle movable along the existing furrow is coupled with the implement. The work vehicle includes an electrical processor coupled with a memory. The existing elevation profile is stored in the memory, and the processor calculates a target elevation profile for the existing furrow. The processor also is coupled with and controllably actuates the adjustable ridge forming tool along a length of each furrow to achieve the target elevation profile.

DETAILED DESCRIPTION OF THE INVENTION

Figure 1:
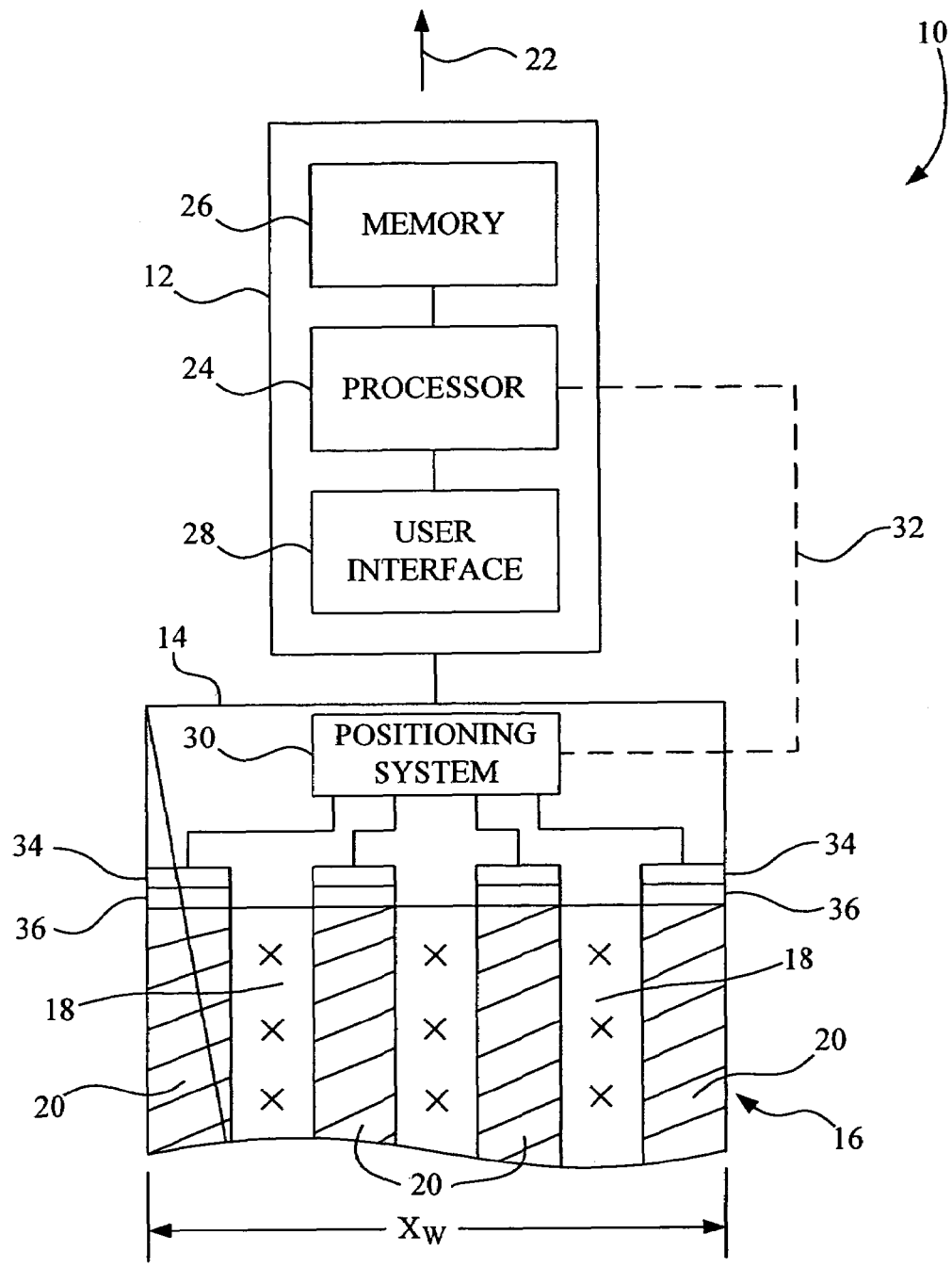
FIG. 1 is a schematic view of an embodiment of the furrow shaping system of the present invention.

Referring now to the drawings, and more particularly to FIG. 1, there is shown an embodiment of a furrow shaping system 10 of the present invention for shaping a furrow in soil. Furrow shaping system 10 generally includes a work vehicle 12 which is attached with an implement 14 moving across a geographic unit 16 of soil. In the embodiment shown, geographic unit 16 corresponds to a predefined number of rows of a ridge planted crop, with each row including a ridge 18 lying between a pair of generally parallel furrows 20 (shown cross-hatched in FIG. 1 for illustration). Geographic unit 16 has a width $X_w$ corresponding generally to the width of implement 14, and a length corresponding to the length of ridges 18 and furrows 20 across a field. The X's placed at spaced apart intervals along the top of each ridge 18 represent the locations at which crop plants are planted, corresponding to a desired plant population within geographic unit 16. The number of ridges and rows within each geographic unit 16 correspond to the width of ridges 18 and furrows 20 across the working width $X_w$ of implement 14.

Although geographic unit 16 is shown as corresponding to a number of rows extending across the width of an implement and the length of a field, it is also possible to define geographic unit 16 with any desired discrete shape and size. For example, geographic unit 16 can be an entire field, or a different number of rows within the field.

Work vehicle 12, such as an agricultural tractor, typically includes an internal combustion engine providing motive force to a plurality of wheels or tracks (not shown) for moving work vehicle 12 and implement 14 along the length of ridges 18 and furrows 20 within geographic unit 16, as indicated by arrow 22. Work vehicle 12 also includes an electrical processor 24 which is coupled with a memory 26 and user interface 28. Processor 24 may include any desired combination of hardware, firmware and/or software for carrying out functions and actuating certain subsystems onboard work vehicle 12 and/or implement 14. Memory 26 preferably is in the form of a long term memory, but may also be in the form of a short term memory, or a combination thereof.

User interface 28 may include a user input device such as a keyboard or touch screen, and/or a display such as an LCD display for displaying selected information.

Implement 14 carries a positioning system 30 which is coupled with processor 24 onboard work vehicle 12, as indicated by dashed line 32. For example, positioning system 30 may be electrically wired with processor 24, or wirelessly coupled with processor 24 using radio frequency (RF) technology. Positioning system 30 is coupled with a plurality of adjustable ridge forming tools 34, and optionally a corresponding number of floor engaging devices 36. Each floor engaging device 36 engages the floor of a furrow 20 and provides output signals to positioning system 30 and processor 24 for determining an existing elevation profile of each furrow 20 along the length thereof within geographic unit 16. An example of a floor engaging device 36 in the form of a wheel is shown in FIG. 2, but other configurations such as a shoe, plate with tapered leading edge, etc. are also possible.

Adjustable ridge forming tool 34 will be described in more detail below with reference to FIG. 4.

Figure 2:
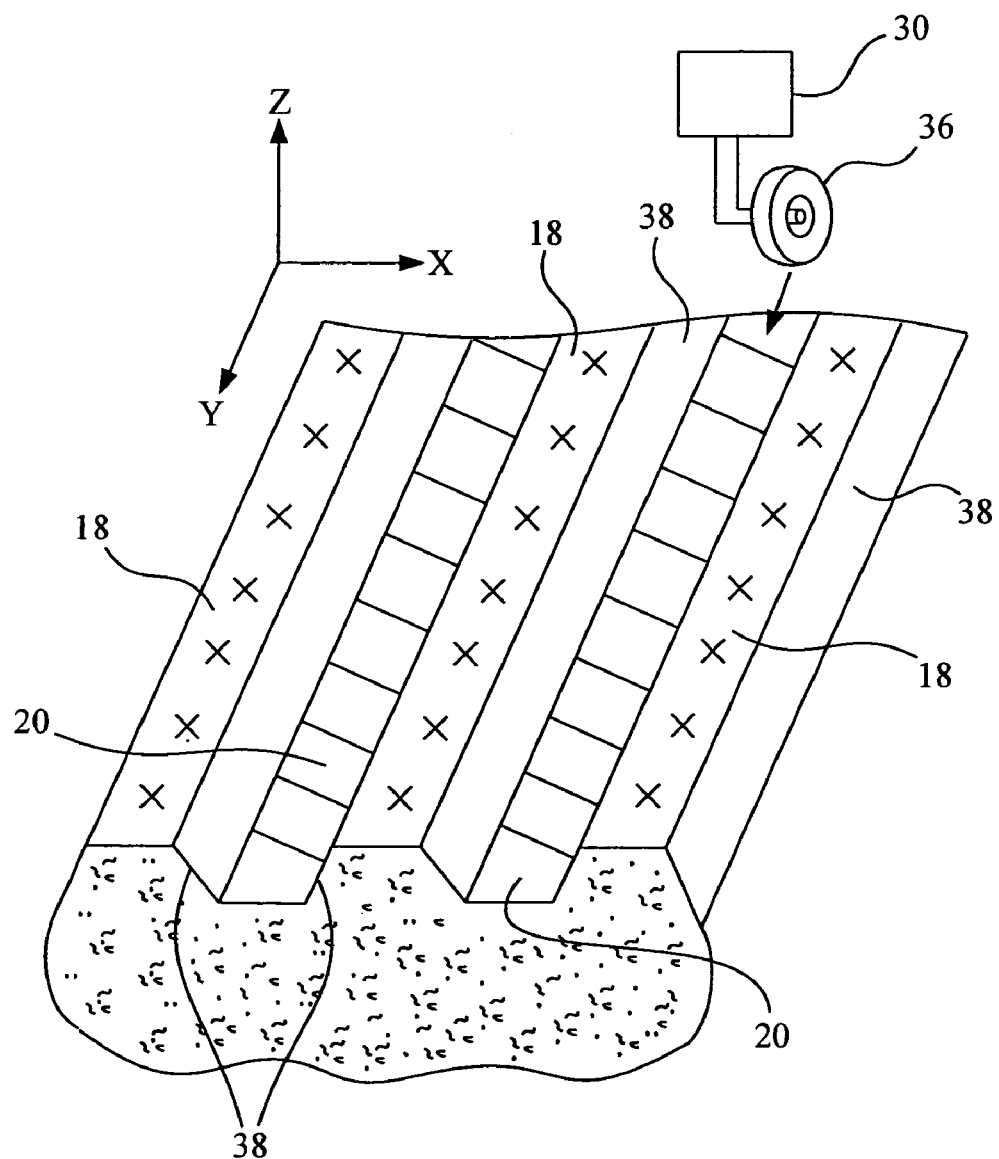
FIG. 2 is a perspective, fragmentary, schematic view of a portion of a field with which the furrow shaping system of FIG. 1 may be used.

Referring to FIG. 2, the plurality of ridges 18 and furrows 20 which are reshaped using the furrow shaping method of the present invention are interconnected by angled sidewalls 38. Typically, ridges 18, furrows 20 and sidewalls 38 are formed using a ridge forming tool having a fixed geometry. A field is flattened and an overall desired grade is achieved using earth moving equipment, grader blades, etc. Thereafter, ridges 18, furrows 20 and sidewalls 38 are formed using the fixed geometry ridge forming tool. The furrow shaping method of the present invention does not move soil along the length of furrows 20, but rather variably changes the width of ridges 18 to add soil to furrows 20 or remove soil from furrows 20 along the length thereof.

Figure 3:
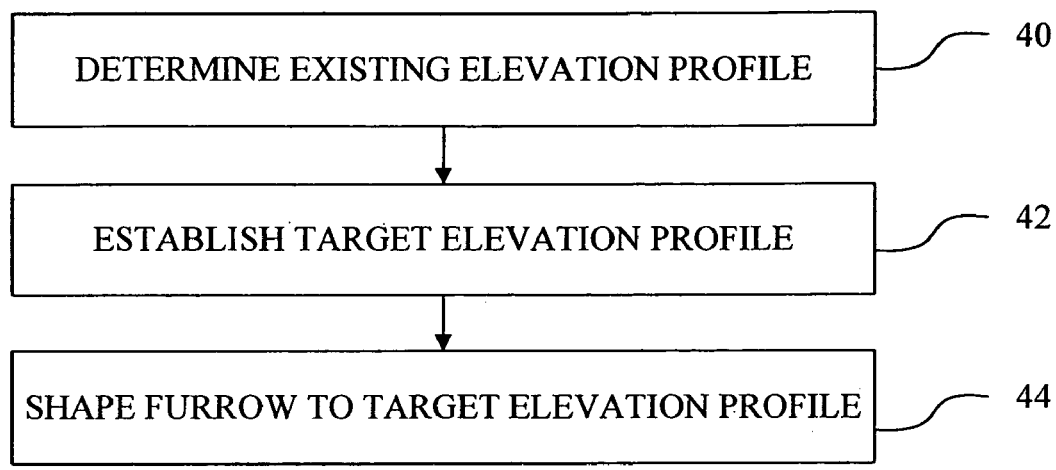
FIG. 3 is a flow chart of an embodiment of the furrow shaping method of the present invention.

Referring now to FIG. 3, an embodiment of the furrow shaping method of the present invention will be described in greater detail. For a geometric unit, it is necessary to determine existing elevation profiles along the length of the floor of each furrow 20 (step 40). In one embodiment, work vehicle 12 and implement 14 are moved across geographic unit 16 and a plurality of wheels 36 respectively associated with each furrow 20 provide localized elevation data for furrow 20 to positioning system 30 and processor 24. Another option for determining existing elevation profiles for each furrow 20 is to utilize previously determined elevation profile definitions for the geographic unit. The previously determined elevation profiles can be from another field operation over the geographic unit which immediately preceded or was at an earlier point in time. If previously determined elevation profiles are utilized, the information must be current enough that the elevation profiles have not likely changed as a result of washouts from irrigation or rain, etc.

Positioning system 30 preferably provides three-dimensional data within geographic unit 16. An example of a positioning system providing three-dimensional data is a real-time kinetic global positioning system (RTK GPS). Other positioning systems providing elevation data may also be used, such as a laser plane. The existing elevation profile for each furrow 20 is stored in memory 26. The size of geographic unit 16 can be expanded to a larger area such as an entire field if memory 26 has sufficient capacity to store all of the elevation profiles.

Processor 24 calculates a target elevation profile for each furrow 20 within geographic unit 16 (step 42). The target elevation profile for each furrow 20 can be an average value with a number of adjacent furrows, or each furrow can have a separately calculated target elevation profile. The data for each target elevation profile is also stored in memory 26 for subsequent use in the shaping of furrows 20 and ridges 18.

With a known existing elevation profile for each furrow 20 and the target elevation profile for each furrow 20, implement 14 is moved across geographic unit 16 along the length of furrows 20. Positioning system 30, under control of processor 24, controllably actuates adjustable ridge forming tools 34 as work vehicle 12 and implement 14 traverse across the geographic unit. Each adjustable ridge forming tool 34 is controllable to remove soil from the bottom of furrow 20 and push the soil toward one or both adjacent sidewalls 38 if the floor of furrow 20 is too high. Similarly, each adjustable ridge forming tool 34 can be controllably actuated to remove soil from one or both adjacent sidewalls 38 and deposit the soil in the furrow if the floor of the furrow is too low. In this manner, the floor of each furrow 20 along the length of a geographic unit can be raised and lowered as necessary to achieve a desired slope for proper water flow resulting from rain or irrigation (step 44).

Figure 4:
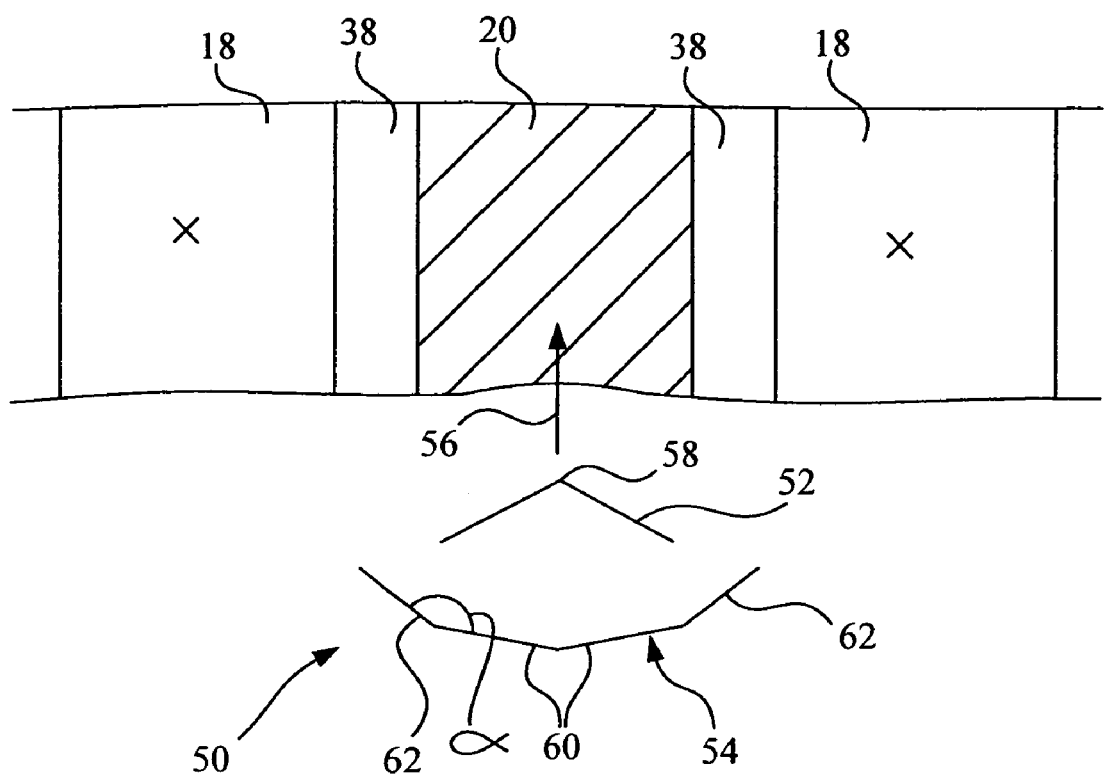
FIG. 4 is a schematic, top view of an embodiment of an adjustable ridge shaping tool used with the furrow shaping method and system of the present invention.

FIG. 4 illustrates an embodiment of an adjustable ridge forming tool 50 which may be used with the method and system of the present invention. Ridge forming tool 50 is shown with respect to ridges 18, a furrow 20 and pair of interconnecting sidewalls 38. Ridge forming tool 50 includes a front blade 52 and a rear blade 54, with respect to a travel direction 56 through furrow 20. Front blade 52 is a fixed geometry V-shaped blade with a pair of plates interconnected at a leading edge 58. The bottom edge of blade 52 is positioned at a desired depth of furrow 20. In the event furrow 20 is too high, then blade 54 is raised to a non-working position (perpendicular to the plane of FIG. 4 toward the reader) and blade 52 moves soil laterally toward side walls 38. In the embodiment shown, the overall width of blade 52 is slightly less than the current width of furrow 20, but could be approximately the same width as furrow 20. Moreover, the fixed angle between the pair of plates forming blade 52 can vary, depending upon the desired laterally outward pushing effect of blade 52.

Blade 54 includes a pair of fixed plates 60, each connected at the outboard end with a wing plate 62. Blade 54 is movable in directions perpendicular to the drawing plane of FIG. 4 as indicated above, such as with hydraulic or pneumatic cylinders, linkages, screws, etc. connected to a suitable framework. Each wing plate 62 is at a fixed angular orientation a relative to plates 60, but may also be angularly adjustable to remove a varying amount of soil from tapered sidewalls 38. In the event furrow 20 is too low, then blade 54 is lowered to a working position until the bottom edge thereof is generally in the same plane as the bottom edge of blade 52 (perpendicular to the plane of FIG. 4 away the reader). Soil which rolls laterally off of blade 52 is releveled using blade 54, and soil removed from tapered sidewalls 38 is releveled using blade 54.

Although blade 54 is shown with wing plates 62 at a fixed angular orientation a relative to plates 60, it may be desirable to make wing plates 62 at an adjustable angular orientation a relative to plates 60. In this manner, the amount of soil deposited on the floor of furrow 20 can be further controlled to reach a target elevation level.

Although the present invention is described above with respect to shaping furrows in a surface irrigation system, it is to be understood that the method and system for shaping furrows of the present invention can be used in any application requiring the forming of ridges separated by furrows, such as non-irrigated ridge planted crops.

Having described the preferred embodiment, it will become apparent that various modifications can be made without departing from the scope of the invention as defined in the accompanying claims.

The invention claimed is:

1. A method of shaping a furrow in soil, comprising the steps of:
   determining an existing elevation profile along a length of a floor for an existing furrow via a positioning system carried by an implement and receiving elevation profile signals from one or more floor engaging devices;
   establishing a target elevation profile along said length of said existing furrow; and
   moving soil laterally either toward or away from at least one side wall of said furrow to achieve said target elevation profile along said length of said furrow as the implement traverses the furrow.

2. The method of shaping a furrow of claim 1, wherein said positioning system comprises one of an RTK GPS and a laser plane.

3. The method of shaping a furrow of claim 1, wherein said positioning system comprises a 3 dimensional positioning system.

4. The method of shaping a furrow of claim 3, wherein said method steps are carried out in a plurality of furrows for a geographic unit.

5. The method of shaping a furrow of claim 4, wherein said geographic unit comprises one of a field and a predetermined number of said furrows.

6. The method of shaping a furrow of claim 5, wherein said predetermined number of furrows corresponds to a working width of said work vehicle.

7. The method of shaping a furrow of claim 1, including an implement carrying said positioning system and attached to said work vehicle.

8. The method of shaping a furrow of claim 7, wherein said implement includes a floor engaging device associated with said positioning system.

9. The method of shaping a furrow of claim 1, wherein said existing elevation profile is determined using one of a current pass of said work vehicle moving along said existing furrow, and a previous pass of said work vehicle moving along said existing furrow.

10. The method of shaping a furrow of claim 1, including the step of storing said existing elevation profile in a memory.

11. The method of shaping a furrow of claim 1, wherein said target elevation profile for said existing furrow is based upon a desired slope along a length of said furrow.

12. The method of shaping a furrow of claim 1, wherein said step of moving soil is carried out using an adjustable ridge forming tool.

13. A method of shaping furrows in soil, comprising the steps of:
   determining existing elevation profiles for a plurality of existing furrows in a geographic unit via a positioning system carried by an implement and receiving elevation profile signals from floor engaging devices;
   establishing a target elevation profile for each of said existing furrows; and
   moving soil laterally either toward or away from at least one side wall along a length of each said furrow to achieve said target elevation profiles within said geographic unit as the implement traverses the furrows.

14. The method of shaping furrows of claim 13, wherein said positioning system comprises one of an RTK GPS and a laser plane.

15. The method of shaping furrows of claim 13, wherein said positioning system comprises a 3 dimensional positioning system.

16. The method of shaping furrows of claim 15, wherein said geographic unit comprises one of a field and a predetermined number of said furrows.

17. The method of shaping furrows of claim 13, including an implement carrying said positioning system and attached to said work vehicle.

18. The method of shaping furrows of claim 17, wherein said implement includes a floor engaging device associated with said positioning system.

19. The method of shaping furrows of claim 13, wherein said existing elevation profile is determined using one of a current pass of said work vehicle moving along said existing furrows, and a previous pass of said work vehicle moving along said existing furrows.

20. The method of shaping furrows of claim 13, including the step of storing said existing elevation profiles in a memory.

21. The method of shaping furrows of claim 13, wherein said target elevation profiles are based upon at least one desired slope along said lengths of said furrows.

22. The method of shaping furrows of claim 13, wherein said step of moving soil is carried out using an adjustable ridge forming tool.

23. The method of shaping furrows of claim 13, wherein each said existing elevation profile corresponds to a floor of a corresponding said existing furrow.

24. A system for shaping a furrow in soil, comprising:
   a positioning system movable across an existing furrow for determining an existing elevation profile along a length of the existing furrow, the positioning system carried by an implement and arranged for receipt of elevation profile signals from floor engaging devices;
   an implement including an adjustable ridge forming tool for moving soil laterally either toward or away from at least one side wall of the furrow;
   a work vehicle movable along the existing furrow and coupled with said implement, said work vehicle including an electrical processor coupled with a memory, said existing elevation profile stored in said memory, said processor calculating a target elevation profile for the existing furrow, said processor coupled with and controllably actuating said adjustable ridge forming tool along a length of each said furrow to achieve said target elevation profile.

25. The system for shaping a furrow of claim 24, wherein said positioning system determines existing elevation profiles for a plurality of existing furrows, and said implement includes a plurality of adjustable ridge forming tools respectively associated with said plurality of existing furrows, said processor controllably actuating each of said adjustable ridge forming tools.

26. The system for shaping a furrow of claim 25, wherein said processor controllably actuates each of said adjustable ridge forming tools one of dependent and independent from each other.

27. The system for shaping a furrow of claim 24, including a user interface coupled with said processor.

* * * * *